Feb. 15, 1944.  G. A. WIELAND  2,341,517

WATER SUPPLY SYSTEM

Filed Sept. 16, 1940

INVENTOR.
BY George A. Wieland.
Geo. Stevens.

Patented Feb. 15, 1944

2,341,517

UNITED STATES PATENT OFFICE 2,341,517

WATER SUPPLY SYSTEM

George A. Wieland, Duluth, Minn.

Application September 16, 1940, Serial No. 356,961

3 Claims. (Cl. 103—5)

This invention relates to water supply systems and has special reference to such a system used in connection with a water supply for a municipality, or the like, and wherein an intake pipe is extended within a relatively large body of water and pumped to a much higher elevation for subsequent use.

The instant invention resides principally in an improvement applicable to the intake pipe whereby leakage into the pipe intermediate of its ends is prevented, and the principal object of the invention is to provide as efficient and practical means of this character as possible.

Other objects and advantages of the invention will appear in the following description thereof.

Referring now to the accompanying drawing, forming part of this application, and wherein like reference characters indicate like parts:

Figure 1:
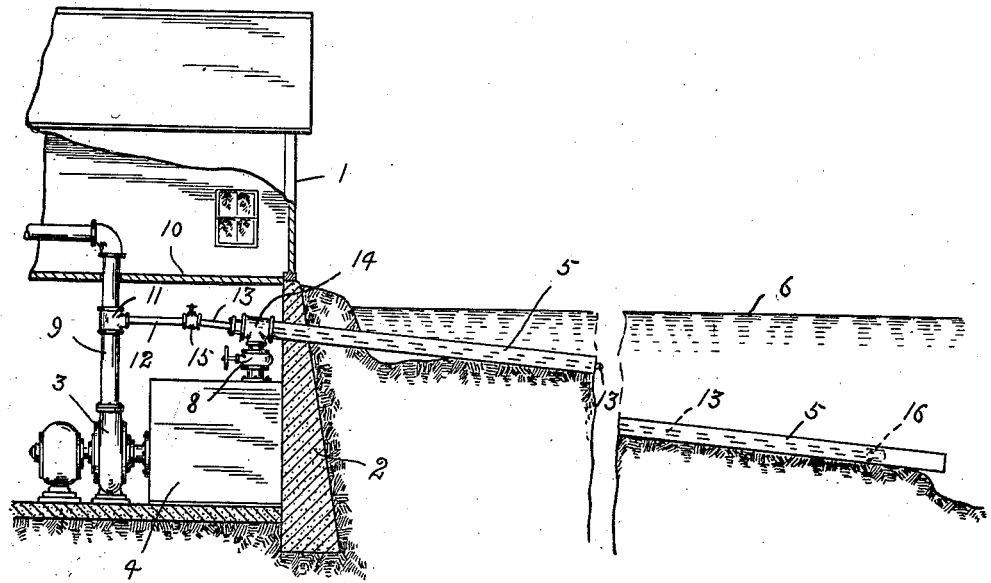
Figure 1 is a vertical sectional view through a portion of a pumping station for such a water supply, portions of which are illustrated in elevation, and other portions broken away.
Figures 2, 3:
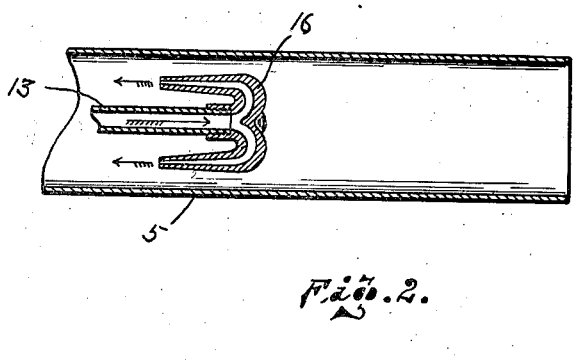
Figure 2 is an enlarged vertical section through a portion of the intake pipe adjacent the outermost end thereof.
Figure 3 is an outer end elevation of the intake pipe looking inwardly thereof.

In the drawing, the numeral 1 represents a building as might be employed at a pumping station, and 2 one wall of the foundation thereof, while 3 represents a centrifugal pump employed within the basement of the building and pumping directly from a tank or well 4, but which may of course be of some other arrangement and construction than that here shown.

The suction pipe for such a pumping station is illustrated at 5 and may extend some considerable distance into a body of water and away from the shore thereof, such a body of water being illustrated at 6, and the bottom thereof is indicated at 7.

In the present illustration, the intake pipe is shown as extending through the shore bank of the body of water and through the foundation wall 2 within the basement of the building, and discharging downwardly into the tank 4, the discharge being controlled by the valve 8.

The discharge from the pump 3 is illustrative at 9 and shown as extending up through the floor 10 of the building and thence outwardly to wherever desired, for example, to storage reservoirs, or the like, located materially above the pump and source of supply, thus resulting in considerable hydrostatic pressure existing at all times in said discharge pipe.

A relatively small bypass connection is illustrated at 11 and to which the discharge pipe 12 is attached, it being designed to extend as at 13 outwardly towards the body of water from which the supply is taken and into the upper end of the intake pipe as for example through the connection 14, and this branch pipe is provided with a control valve 15, so that the discharge of water through the branch pipe 12 may readily be controlled. The extension 13 of the branch pipe 12 is continued through substantially the entire length of the intake pipe 5 and supported centrally thereof in any desired manner at least to within a comparatively short distance of the suction end of said intake pipe, where it is equipped with a reverse syphon nozzle indicated at 16, and the nozzle is preferably shown as having a plurality of tapered discharge orifices pointing backwardly towards the inner end of the intake pipe.

In this instance I have shown four of such nozzles which is deemed to suffice for the purpose intended, and which purpose is for the very simple object of maintaining at least during the pumping operations a slightly greater pressure within the intake pipe than exists outside of same, so that in the event of there being, or at any time occurring, a leak intermediate of the ends of the pipe, foreign or contaminated water such as might exist near the shore cannot enter the pipe through said leak during such pumping operation, it being, of course, understood, that for such purpose the valve intermediate of the pipes 12 and 13 is properly adjusted for such effect.

Having thus described my invention, what I claim and desire to secure by Letters Patent, is:

1. The combination with a water supply system having an intake pipe submerged in a body of water from which the system is supplied with water, a well connected to said pipe below the water level of said body of water and supplied by gravity therefrom, a pump for pumping water from said well to a place of discharge, and means connected with the discharge of said pump to maintain a slightly greater pressure within said pipe than exists outside of said pipe, whereby to prevent water entering said pipe except through the intake end thereof.

2. The combination with a water supply system having an intake pipe submerged in a body of water from which the system is supplied with water, a well below the water level of said body of water and connected to said intake pipe, a pump for pumping water from said well to a place of storage, a smaller pipe connected to the outlet of said pump and extending within said intake pipe, terminating adjacent the outer end thereof, and discharging backwardly therein, to increase the pressure within said intake pipe slightly above that which occurs outside of said pipe.

3. A water supply system adjacent a body of water comprising a well installed below the water level of said body of water, an intake pipe connected to said well and extending a distance into said body of water adjacent the bottom thereof and whereby said well is filled with water by gravity, a pump connected to said well for pumping water therefrom to a place of storage, and a smaller pipe connected to the outlet of said pump and extending to adjacent the end of said intake pipe and discharging backwardly therein, whereby the pressure within said intake pipe is raised slightly above the external pressure on said pipe and thereby prevents water entering said pipe except through the intake end thereof.

GEORGE A. WIELAND.